United States Patent [19]

Daisenberger

[11] Patent Number: 4,626,625
[45] Date of Patent: * Dec. 2, 1986

[54] TELECOMMUNICATIONS SYSTEM, PARTICULARLY A TELEPHONE EXCHANGE SYSTEM, HAVING OVERLOAD PROTECTED SEQUENTIAL LOGIC SYSTEMS

[75] Inventor: Georg Daisenberger, Munich, Fed. Rep. of Germany

[73] Assignee: Siemens Aktiengesellschaft, Berlin & Munich, Fed. Rep. of Germany

[*] Notice: The portion of the term of this patent subsequent to Sep. 23, 2003 has been disclaimed.

[21] Appl. No.: 584,120

[22] Filed: Feb. 27, 1984

[30] Foreign Application Priority Data

Mar. 31, 1983 [DE] Fed. Rep. of Germany ....... 3311875

[51] Int. Cl.$^4$ .......................................... H04M 15/26
[52] U.S. Cl. .................................. 379/137; 379/198; 379/279
[58] Field of Search .................... 179/8 A, 9, 8 R, 10, 179/18 EB, 18 EE, 18 ES, 18 EA

[56] References Cited

U.S. PATENT DOCUMENTS

| | | | |
|---|---|---|---|
| 3,665,110 | 5/1972 | Gerke et al. .................. | 179/18 EA |
| 4,200,771 | 4/1980 | Kraushaar et al. ................ | 179/8 A |
| 4,224,479 | 9/1980 | Crawford ...................... | 179/8 DA |
| 4,399,332 | 8/1983 | Furlan et al. ...................... | 179/8 A |
| 4,497,978 | 2/1985 | Schoute et al. .......................... | 179/9 |
| 4,511,762 | 4/1985 | Stockdale ................................ | 179/9 |

FOREIGN PATENT DOCUMENTS

3104002 8/1982 Fed. Rep. of Germany .
79/2960 6/1980 South Africa .

OTHER PUBLICATIONS

Samoza, "Dynamic Processor . . . SPC Systems", 9th International Teletraffic Conference, 1979, Torremolinos, Spain, Paper ITC-9, pp. 1-7.

Besier, "Der Übergang zum Digitalen Ortsnetz", NTZ, 1980, vol. 33, No. 10, pp. 646-652.

Asmussen, "EWSD Digital Switching System", Telcom Report, 1981, vol. 4, pp. 3-68.

Lucky, "A Flexible Experimental Digital Switching Office", Int. Zurich Seminar on Digital Communications, Proc. IEEE, Cat. 78, No. 9, pp. A4.1-A4.4.

Horiki et al., "Design Philosophies on Local Digital Switching Systems", Int. Zurich Seminar on Digital Communications, Proc. IEEE, Cat. 78, No. 9., pp. B2.1-B2.5.

*Primary Examiner*—Stafford D. Schreyer
*Attorney, Agent, or Firm*—Hill, Van Santen, Steadman & Simpson

[57] ABSTRACT

For the purpose of averting overloads at control units for groups of subscriber-associated or call-associated switch devices, a counter is incremented with every occupation and deincremented cyclically. The counter emits an overload signal upon the attainment of a limiting value, the overload signal being forwarded to that switch device or being assigned in a memory shared by the switch device to that switch device from which the occupation signal that leads to the immediate attainment of the limiting value in the counter has arrived. The overload signal is formed in the time between occupation and the first selection character, leads to the emission of a corresponding audible character (busy signal) and prevents the acceptance of selection characters. Alternatively, when the counter reaches the limiting value due to an occupation, the information corresponding thereto are still accepted, but a next occupation is not accepted until sufficient time for a corresponding number of deincrementation steps has elapsed.

3 Claims, 2 Drawing Figures

TELECOMMUNICATIONS SYSTEM, PARTICULARLY A TELEPHONE EXCHANGE SYSTEM, HAVING OVERLOAD PROTECTED SEQUENTIAL LOGIC SYSTEMS

CROSS REFERENCE TO RELATED APPLICATIONS

This application is related to applications Ser. Nos. (583,893), filed Feb. 27, 1984, (582,607), filed Feb. 22, 1984, (582,610), filed Feb. 22, 1984, and (582,557), filed Feb. 22, 1984.

BACKGROUND OF THE INVENTION

1. Field of the Invention

The present invention relates to a circuit arrangement for telecommunication systems, particularly telephone exchange systems, comprising centralized and/or partially centralized, information-processing sequential logic systems having a limited call handling capacity with respect to the information processing capacity and comprising apparatus for identifying the information processing traffic load of a respective sequential logic system and for perceiving information processing traffic overloads and comprising counters serving to advert such overloads. The counters are incremented based on the measure of control signals appertaining to the traffic load and are deincremented at regular time intervals according to the information processing capacity and the attainment of a limiting value.

2. Description of the Prior Art

A circuit arrangement of this general type is disclosed in the German application No. 32 36 130. With the circuit arrangement disclosed in this application, overload signals are supplied to partially-centralized switching devices which supply information to a centralized information processing device for information processing, the overload signal being supplied thereto by the information processing device when its load capability limit with respect to traffic has been exceeded. The counters provided in the partially-centralized switching device therefore receive overload signals from the centralized information processing device. The overload problem, therefore, lies in the centralized information processing device. Averting overloads is carried out in the partially-centralized switching device. To this end, the latter receives overload signals from the centralized information processing device. The overload situation, therefore, is identified where it becomes a problem, namely in the centralized information processing device. The application does not state how this identification of the overload situation occurs; however, this is well known to those skilled in the art.

It was explained in a lecture at the "9th International Teletraffic Congress (ITC)" in October 1979 at Torremolinos, Spain (conference paper ITC-9 of Somoza et al, 1-7) for the recognition of the overload situation and the formation of overload signals that the number of requests arriving at a centralized computer are counted in individual time segments following successively upon one another and that the tally result thereby obtained each time is compared to a comparative value; this, moreover, is varied as a function of the respectively-existing operating situation. Every comparison result provides traffic information with respect to the question of the momentary computer traffic load, particularly regarding a potential overload. The number of computer requests and, therefore, the input information to be processed in the computer can be restricted or temporarily stopped entirely on the basis of the traffic load results acquired by counting in each of the time segments and identified by way of comparison after each conclusion of counting. The traffic load is thereby to be optimally matched to the call-handling capability and overload limits of the computer in order to achieve as high as possible a utilization of the computer capacity, as well as to avoid, insofar as possible, traffic overloads, these resulting, as known, in considerable, temporary operations restrictions or operations disruptions for the devices which use the computer. In the cases of use addressed in the lecture, therefore, this is improved by way of dynamic connection of the traffic load to the jobs of computing according to various types and, therein, according to the frequency of the jobs of computing supplied to the computer.

The known methods for proceeding and regulating the computer load, however, supply an adequately-precise result only when the individual time interval employed for counting the appertaining events, for example computer requests, is sufficiently large with respect to the mean chronological spacing between these events so that fluctuations in the computer traffic load, the load rising and falling continuously, do not cause the computer traffic load to be represented in coarse skips so that a corresponding control is capable of optimally matching the computer traffic load to the load capacity. The requirement inherent therein, namely that the time interval for the individual tally of the events must be sufficiently large, has a negative effect on the respective time at which the results of each of the tally operations are available. The result of identifying the computer traffic load, therefore, still always exhibits a time lag that is necessarily conditioned by the fact that the corresponding result for each acquisition time interval is identified only after the time interval has elapsed, being identified, in particular, by way of a comparison operation. This time lag is, in turn, disadvantageous to influencing the computer traffic load for the purpose of regulating the load. For, in particular, either averting an overload can only take effect when the overload situation has already occurred, i.e. too late in view of actually arising overloads, or the aversion of an overload must already begin before the overload limit of the computer has been reached, i.e. "under suspension", thus not only in those operating instances in which the computer traffic load in fact rises above the loadability limit, rather, in addition, in all of those operating instances as well in which the rise of the computer traffic load in the direction towards the loadability limit only produces the assumption that the loadability limit will be transgressed, but in which the computer traffic load does not in fact reach or exceed the loadability limit. The problem therefore lies in the extrapolation of the load behavior over the time. A regulation, however, is less and less effective the later it begins; its relatively late beginning, in addition, can result in the fact that periods of more-pronounced under-utilization alternate continuously with periods of overload without this being actually caused by the traffic load that in fact occurs. The mentioned requirement is further intensified by the condition that the chronological distribution of the events to be acquired scatters noticeably, that, therefore, the chronological spacings between the respectively-successive events are relatively unequal in comparison to one another. This effect is all the more aggravating the smaller the respective acquisition range; the greater the range is, in particular, the greater the influence of the compensating effect of the statistical distribution. This generally testifies in favor of providing the implemented identification of the overload situation at a central location.

SUMMARY OF THE INVENTION

There are, however, cases of apparatus for averting overloads in which the respective acquisition range is relatively small and the result of a traffic measurement, given the precondition of sufficiently-high precision, is available late, along with corresponding apparatus of a known type in comparison to the respectively-required point in time that necessary control operations take effect. In quite general terms, therefore, the object of the invention is to make such a result available with sufficiently-high precision and at a respectively earlier time. Given the cooperation of partially-centralized sequential logic systems with a centralized sequential logic system, the problem areas set forth above particularly exists when the former supply information to the latter for further processing. It is particularly important to keep overloads away from a centralized sequential logic system because of the central functional significance of a centralized sequential logic system. Presented in simplified terms, it is a matter of adverting overloads for centralized sequential logic systems and to undertake appropriate counter-measures, namely to undertake such counter measures in time before such overloads can appear. In view of these relationships just presented, the object of the invention can be stated as perceiving an overload approaching a centralized sequential logic system as early as possible and initiating defensive measures as early as possible in order to also achieve as uniform as possible a regulating effect with respect thereto.

This object is achieved in a system of the general type set forth above in that the control signals are initial switch identifiers, particularly control characters derived therefrom, which respectively announce a subsequent arrival of an information to be processed and in that, by way of accumulation of these characters with the counter, an overload signal upon attaining the limiting value is formed either an initial switch identifier leading to the attainment of the limiting value and a first character of a corresponding information, the first character being assigned to the initial switch identifier, this leading to the fact that these characters are not accepted by the appertaining sequential logic system, or is formed after the acceptance of an initial switch identifier and, after acceptance of the information corresponding thereto, leads to the fact that a further initial switch identifier is not accepted Whereas the counters receive overload signals in the known instance as initially described, they receive initial switch identifiers according to the invention; overload signals, by contrast, are emitted by the counters. The chronological spacing between the initial switch identifier and the beginning of the information respectively announced by the initial switch identifier is exploited for this purpose. The overload signal likewise does not lead to a general input block of information for the appertaining sequential logic system, but has a selective effect and is restricted to only that information whose assigned initial switch identifier directly triggered, i.e. caused, the arisal of the overload signal.

BRIEF DESCRIPTION OF THE DRAWINGS

Other objects, features and advantages of the invention, its organization, construction and operation will be best understood from the following detailed description, taken in conjunction with the accompanying drawings, on which:

FIGS. 1 and 2 illustrate an exemplary embodiment of the invention and shows only those components which essentially contribute to an understanding of the invention.

DESCRIPTION OF THE PREFERRED EMBODIMENTS

Figure 1:
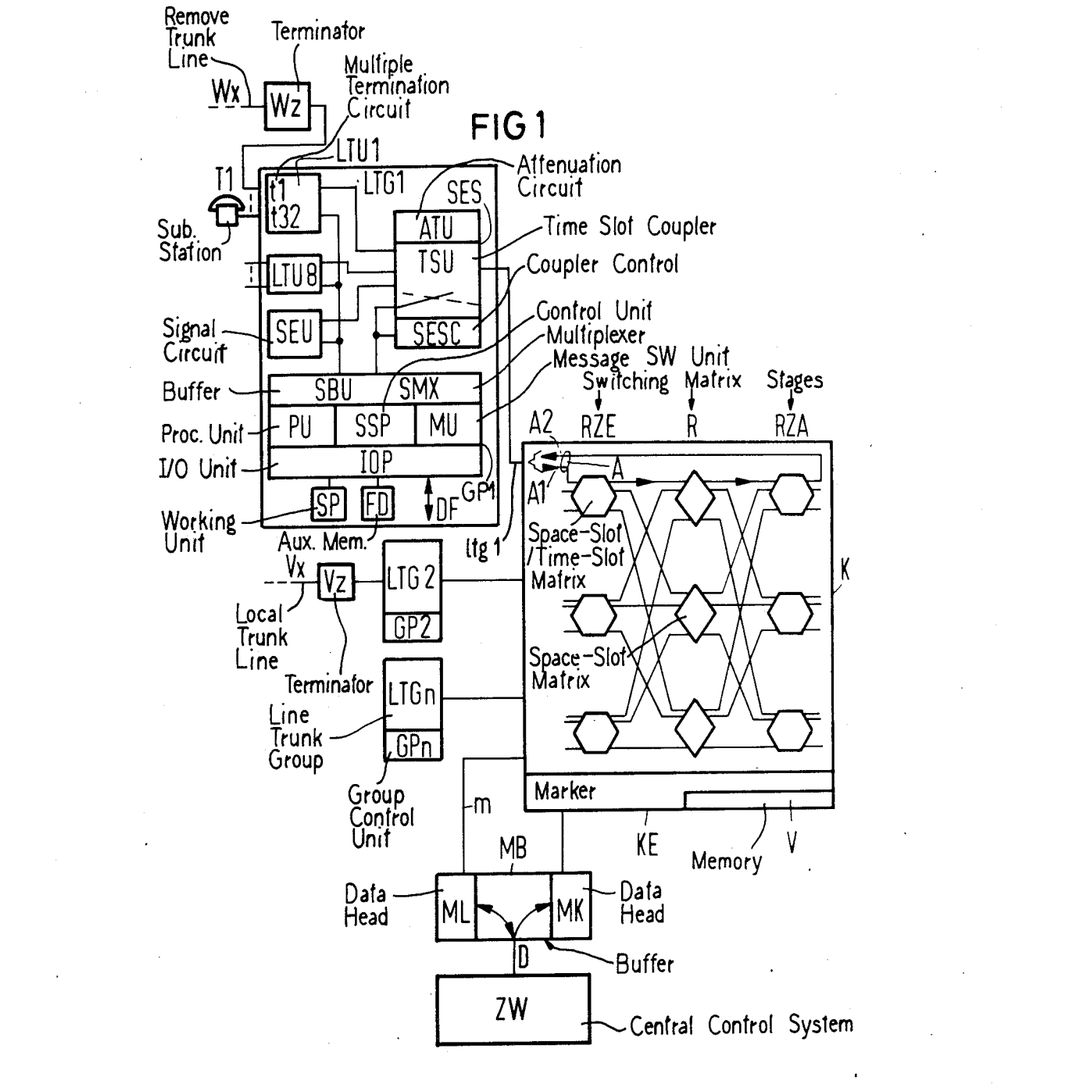
FIG. 1 is a schematic representation of a telephone exchange system constructed to operate in accordance with the invention.

Turning first to FIG. 1, a switching matrix network is illustrated as being constructed in three switching stages RZE, R and RZA and has a larger plurality of switching matrix network terminals at its input side, one of the terminals being illustrated and referenced A. The switching matrix network comprises a plurality of switching matrix network components. Each of the switching matrix network terminals always comprises a pair of time-division multiplex lines, of which the one time-division multiplex line serves for signal transmission to the switching matrix network and the other time-division multiplex line serves for signal transmission out of the switching matrix network. The switching matrix network terminal A, accordingly, comprises a time-division multiplex line A1 and a time-division multiplex line A2. The respective signal transmission direction of each of these two time-division multiplex line is indicated by way of corresponding arrows.

The switching matrices of the first switching stage RZE are combined time-slot/space-slot multiples, as the illustrated symbol show. The switching matrices of the center switching stage R are space-slot multiples. The switching matrices of the last switching stage RZA are again space-slot/time-slot multiples. A larger plurality of the multiples is provided in each switching stage, even though only three respective multiples of the specified type are illustrated per switching stage. The switching matrices of the various switching stages are connected to one another over links in the manner to be derived from the drawing. These links are time-division multiplex links. The switching matrix network terminals are likewise of a time-division nature.

Line trunk groups, for example the line trunk group LTG 1 are connected to the switching matrix network terminals, for example the terminal A of the switching matrix network portion K, over time-division multiplex lines, for example the time-division multiplex line ltg 1, respectively designed for both transmission directions. At its input side, such a line trunk group can be connected with subscriber lines (analog), analog trunks and pulse code modulation (PCM) trunks (alternately as well as in combination). A subscriber station connected over a subscriber line is illustrated and referenced T1. Coder, decoder, multiplexer, demultiplexer and the devices required for a realization of the so-called BORSCHT functions are contained in a line/trunk group (cf. NTZ, 1980, Vol. 33, No. 10, pp. 646–652 and 1978 International Zurich Seminar on Digital Communications, Proceedings IEEE Catalog, No. 78, CH 1325-0 ASST, pp. B2-1, A4.1, as well as the German patent application Nos. P 31 00 811.9, P 31 04 002.0 and P 31 06 903.7.

A line trunk group LTG1 is illustrated on the drawing. Its structure and manner of operation are extensively described in the aforementioned German published application No. 28 26 113 (beginning at the bottom of Page 6), which corresponds to the Republic of South Africa Letters Patent No. 79/2960, both of which are fully incorporated herein by this reference. Further, the Supplement to Volume 4 (1981) of the periodical "telcom report" discusses such structure. The following detailed description, therefore, presumes this structure to be known and is limited to the interrelationships that are particularly significant in the present context.

A central control unit ZW serves, among other things, to set up the call connections to be completed across the switching matrix network. It identifies the switching or exchange data required for the set up of every connection. As known, the exchange data for a call to be through-connected precisely specify the course of the appertaining connection across the switching matrix network, i.e. the switching matrices and links traversed by the connection as well as the channels therein that are respectively occupied. These data are worked up with the assistance of the central control unit which, among other things, therefore exercises the function of a path finding device in addition to that of an occupation memory, and are transmitted to the switching matrix network marking device KE of the switching matrix network K. The data flow from the central control unit ZW to the switching matrix network marking device KE, the data flow transmitting the exchange data, extends over a buffer device MB which is connected to the central control unit over a central data line D. The buffer device MB serves for intermediate storage and recoding of data as well as for matching to the transmission rates. The buffer device can be limited to some of these functions or to respectively only one of these functions. Such a buffer device is disclosed in detail in the German Letters Patent No. 15 37 849, which corresponds to U.S. Pat. No. 3,665,110, fully incorporated herein by this reference.

In addition to the central control unit ZW, a larger plurality of decentralized control devices GP1–GPn is also illustrated, these being respectively individually assigned to the line trunk groups LTG1–LTGn. The control devices serve for the execution of all switching operations within each of the line trunk groups. Included among these switching operations are, in particular, all switching events within these line trunk groups. Further details regarding this can be derived from the aforementioned U.S. Pat. No. 3,665,110.

The decentralized control devices GP1–GPn are in communication with the central control unit ZW over data channels that are individually through-connected per decentralized control device up to the buffer device MB over the switching matrix network K. A respectively separate data channel thus leads to each of the decentralized control devices from the buffer device, namely from its data head ML. To this end, the data head ML of the buffer device MB is connected by way of a time-division multiplex line m to one of the switching matrix network terminals. The buffer device is connected to one of the switching matrix network terminals in the same manner as each of the line trunk groups LTG1–LTGn. The time-division mutiplex line m is therefore connected to a switching matrix network terminal that comprises a time-division multiplex input to a space slot/time slot multiple of the first switching stage and a time-division multiplex output from a space slot/time slot multiple of the last switching stage. The time-division multiplex line m is therefore connected to a switching matrix network terminal like that referenced A.

Every data connection between the data head of a buffer device and each of the line trunk groups, for example the line trunk group LTG1, comprises a channel for the transmission of data from the buffer device to the appertaining line trunk group and a further channel for the transmission of data in the opposite direction. These two data channels lead to and from the decentralized control device assigned individually to the appertaining line trunk group.

The completion and the maintenance of the described data transmission circuits via the switching matrix network K occurs with the assistance of the switching matrix network marking device KE in the same manner as the set up and maintenance of message transmission links, for example telephone connections. To this end, control memories are assigned to the switching matrices of the switching matrix network K in a known manner, the switching or exchange data appertaining to a respective switching matrix being written into the control memories. What is accomplished with the assistance of the control memories is that the required through-connections are available in the respective time slots or, respectively, the required write operations and read operations for the full storages of the time slot multiples occur. All further details relating to the structure and manner of operation of a time-division switching matrix network are presumed here to be well known in the art and are therefore not described in further detail.

As explained above, the switching data required for the completion of message transmission links are transmitted from the central control unit to the switching matrix network marking device KE via the buffer device MB. Serving this purpose, among other things, is a data head MK that is assigned to the buffer device MB. For the sake of completeness, it should be added here that a plurality of switching matrix network marking devices KE can also be connected with a buffer device MB. This plurality of switching matrix network marking devices KE can also be individually assigned to a plurality of switching matrix network parts of a larger switching matrix network. It is also possible to provide a respective switching matrix network marking device per switching stage.

Since the data transmission circuits described above between the buffer device MB to each of the line trunk groups LTG1–LTGn via the time-division multiplex line m must be through-connected with the assistance of the switching matrix network K before the set up of transmission links, for example telephone connections, can be initiated, a completely free switching matrix network is usually available for the completion of these data transmission circuits, i.e. a switching matrix network in which all channels are unoccupied. The set up of the data transmission circuits can therefore occur according to an arbitrarily-defined pattern that remains unaltered for all time. It is therefore provided that the switching matrix network marking device KE also contains marking data, i.e. the exchange data, for the data channels, stored in a memory V assigned thereto. Given a recompletion of the data transmission circuits, these data therefore need not be respectively worked out anew by the central control unit ZW and need not be retransmitted via the buffer device MB. When the data transmission circuits required between the buffer device MB and the line trunk groups LTG1-LTGn, i.e. their decentralized control device GP1-GPn, are to be set up anew via the switching matrix network K, then the central control unit ZW merely emits a corresponding instruction to the buffer device MB which forwards the instruction to the switching matrix network marking device KE and, on the basis of which instruction, the marking device KE takes the switching data stored in its memory V in order to execute the required switching operations in individual succession in a manner known per se.

The preceding description has described the time-division multiplex telephone exchange system of the present invention in more general terms, while the following description relates in more detail to the interrelationships of the elements in accordance with the invention.

As explained in the aforementioned German published application No. 28 26 113 and its corresponding South African No. 79/2960, in addition to transmission links to and from subscriber stations, as well as trunks, the aforementioned data transmission circuits between the decentralized control device, for example the device GP, assigned to the line trunk groups, for example the line trunk group LTG1, and, on the other hand, the central control unit ZW, are completed via a time slot coupler TSU of the line trunk group LTG1. As already presented, these data transmission circuits further extend over the switching matrix network K and the time-division multiplex line n.

As also set forth above, the group control units GP1-GPn are decentralized, or partially decentralized, control devices in comparison to the central control unit ZW. Overall, these partially centralized control units and the central control unit are also referred to as sequential logic systems. The group control units and the central control unit exhibit a limited call-handling capability with respect to the information capacity. The call-handling capability of the central control unit represents a particular problem.

As likewise already indicated, a plurality of line trunk groups LTG1-LTGn is provided in addition to the central switching matrix network K. Over a respective PCM line, for example the line ltg1, each of these line trunk groups is connected to an input of the switching matrix network K in the described manner. This PCM line per line trunk group leads therein to a switch-through unit TSU whose significance and manner of operation are described in detail in the aforementioned German published application No. 28 26 113 and the corresponding South African patent No. 79/2960. This switch-through unit TSU is a matter of a sub-switching matrix network over which both the data transmission circuits and the connections to and from subscribers and to and from trunks are through-connected. What is meant by "trunks", of course, are channels of connected PCM trunks as well. The connection of these subscriber lines, trunks and channels may be derived from the material referenced above.

A variety of information arrive over the subscriber lines, trunks and channels connected to a line trunk group at the input side, for example call signals from subscriber stations that desire a connection, further, selection identifiers of these subscriber stations, but also over trunks and channels, further, line characters via trunks as well as in assignment to channels. The group control unit serves in a known manner for the execution of the acceptance of such incoming, call-associated information. A group control unit also undertakes a processing or a preprocessing of these accepted information in respective assignment to the appertaining subscriber line, trunk or to the appertaining channel. Moreover, some of such information are intermediately stored in memories SP individually assigned to the group control unit, in particular with the assistance of an input/output processor IOP. Further, the group control unit has the task of forwarding signals and control signals for transmission over these lines (subscriber lines and trunks, as well as channels), for example alternating current call pulses, call progress tone signals, selection identifiers, line characters and the like.

Connections are through-connected over the sub-switching matrix network belonging to a line trunk group, this occurring with respect to the call set up direction both incoming from a line (subscriber line, trunk or channel) to the central switching matrix network K as well as outgoing from the network K to such a line. In a call completion, a through-connection of, for example, a subscriber line first occurs over the appertaining line trunk group to the central switching matrix network K. The data required for the further through-connection over this switching matrix network are transmitted from the group control unit GP to the central control unit ZW over the aforementioned, appertaining data transmission circuit. The further through-connection occurs over a line trunk group (the same line trunk group under given conditions, but usually a different line trunk group, to which end the appertaining group control unit of the respective line trunk group must be activated.

With respect to the call set up direction, there are therefore through-connection operations of different types for a group control unit, namely through-connections from a subscriber line or trunk (or a corresponding channel) towards the switching matrix network K, on the one hand, and, on the other hand, through-connections in the opposite direction. The through-connections over a sub-switching matrix network also divide into those two and from subscriber lines, on the one hand, and to and from trunks (or channels), on the other hand. The information acceptance operations and/or information transmission operations executed in the context of these respectively two through-connection operations required per connection lay claim to the respective group control unit, at least once per through-connection operation. The respective type of through-connection (incoming or outgoing, from and to subscriber line or trunk) is the determining factor for the information processing traffic load per through-connection operation necessarily connected with the respective seizure of the group control unit, as already explained, the information that the group control units accept in conjunction with a through-connection operation are forwarded by the group control unit to the central control unit which they share in common. The information is forwarded unaltered or preprocessed. The central control unit likewise issues information to the group control units in order to execute outgoing through-connections required therein and in order to emit signals and control signals over the appertaining lines (subscriber lines and trunks or, respectively, channels). The information to be transmitted from a group control unit to the central control unit per connection setup therefore respectively represent an information portion of limited scope; the respective scope of an information portion derives from the respective type of call setup.

Every call on the part of a subscriber station and every incoming occupation of a trunk (or a corresponding channel) therefore requires a certain job performance on the part of the appertaining group control unit. Every such job performance becomes perceptible on the basis of an initial switch identifier for the respective group control unit. For example, the loop closure that represents the line signal is such an initial switch identifier given a subscriber line with loop pulse generation. The c lead busy signal given incoming occupation is such an initial switching identifier given, for example, the trunk line. An analogous case applies to the call-associated channels. These initial switch identifiers, therefore, differ from one another, namely depending on the appertaining type of line (subscriber line or trunk). In conjunction with the through-connection of a line section of a connection to be established, they respectively signal a corresponding measure of information processing traffic load to be anticipated for the group control unit, particularly in conjunction with acceptance, processing and/or transmission of information. For the different line sections of a connection to be through-connected, therefore, there are specific measures typical with respect thereto that are identical given equivalent line sections of a connection to be through-connected, but which are different given the different line sections. That which is true for each of the group control units also applies in a corresponding manner to the central control unit ZW. Depending upon whether a through-connection is to be executed over the switching matrix network K is a matter of an intra-exchange local call, an outgoing long-distance call or an incoming long-distance call, the degree of information processing traffic load per through-connection is of different magnitudes for the central control unit, in particular depending on the type of call to be setup.

Figure 2:
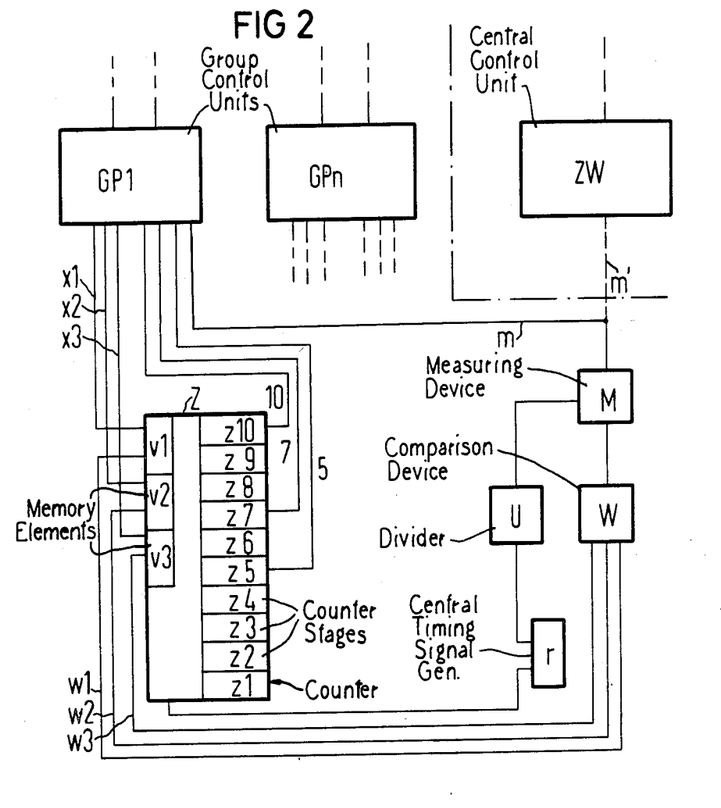
FIG. 2 is a schematic representation of a portion of the telephone exchange system of FIG. 1 as an aid in explaining the inventive characteristics.

The following description is with reference to the structure illustrated in FIG. 2. Indicated on FIG. 2 are the group control unit GP1, the group control unit GPn and the central control unit ZW which are illustrated in FIG. 1. A counter Z is assigned to the group control unit GP1. The same is true of the remaining group control units. Each time a group control unit is seized for an information acceptance given a call on the part of a subscriber who wishes to setup a connection or when a trunk (or, respectively, a channel) is seized for the purpose of through-connecting a call over the sub-switching matrix network and the group control unit corresponding thereto is seized for the acceptance of selection identifiers as well as for the execution of the through-connection over the sub-switching matrix network, or when a through-connection from the switching matrix network to an outgoing trunk (or, respectively, a channel) or to a subscriber line is to be carried out and the central control unit is to accept corresponding information for this purpose, an initial switch identifier arises in the group control unit, and the same always announces a subsequent arrival of an information to be processed.

Given the presence of such an initial switch identifier, a group control unit then always emits a control signal to the counter Z assigned thereto, emitting the control signal, in particular, over one of a plurality of control lines x1, x2, x3. Depending upon the type of information processing traffic load subsequently incurred by the group control unit, the group control unit forwards the control signal to the counter Z over the control line x1 or the control line x2 or the control line x3. The counter Z is incremented by a number of steps with the assistance of these control characters. The respective consequence of the incrementation and deincrementation of the counter is that one of its counting stages $z_1$–$z_{10}$ is marked. Given incrementation of the counter, the marking continues in an ascending direction with respect to the numbering of the designations of the counting elements and proceeds in the opposite direction given deincrementation. The number of steps by which the counter Z is incremented upon each receipt of an initial switch identifier depends, among other things, on the respective quantity of information processing traffic load to be anticipated for the group control unit. Accordingly, the initial switch identifier respectively arrives over a specific control line of the control line x1–x3, whereby the number of incremental steps for the counter is codefined. The term "codefined" here means that the number of incremental steps upon the arrival of an initial switch identifier does not depend solely on which of the control lines x1–x3 the initial switch identifier arrives. Rather, a significance or weighting declaration transmitted over other control lines w1–w3 is also a determining factor.

The counter Z of a group control unit serves for the identification of the information processing traffic load of the respective group control unit, for the recognition of information processing traffic overloads and for averting such overloads. Since all connections are through-connected not only over a sub-switching matrix network, but are always through-connected over the central switching matrix network as well, every seizure of a group control unit results in a seizure of the central control unit. Consequently, the identification of the information processing traffic load of a respective group control unit, the recognition of information processing traffic overloads for this group control unit and averting such overloads from this group control unit also relate at the same time to the information processing traffic load of the central control unit, information processing traffic overloads for the central control unit and averting such overloads. For the particular counter reading of the counters of each of the group control units (averting overloads) also has an effect on the information traffic load of the central control unit and respectively contributes to averting such overloads at the central control unit. As known, the information processing traffic load of the central control unit represents the typical bottleneck given an interplay of group control units and a central control unit; averting information processing traffic overloads from the central control unit is therefore of particular importance.

Up to now, the common term "sequential logic systems" was employed for the group control units and for the central control unit which were subsequently also referred to as "control units" in common. The loadability of each such control unit depends on its format (structure and program execution) and on the type and extent of the information processing operations continuously communicated thereto. Experience has taught that, for example, the composition of information processing operations of various types can shift during the operation of a control unit. It can, for example, occur that it is predominantly local calls that are to be switched through at certain times of the day, whereas long-distance calls predominate at certain other times of day. It can further occur that more brief-duration calls occur at certain times of day and more long-duration calls occur at other times of day. It can further occur that more special services are used at certain times of day than at other times of day. Consequently, the loadability of such a control unit is not constant. It is therefore expedient for the optimal use of a control unit to take the loadabilities given at different operating times, due to differing preconditions, into consideration. It is therefore standard to equip such control units with measuring devices for the identification of the loadability, such devices integrating the constantly-fluctuating load over time intervals that are respectively sufficiently long in order to assure an identification result with sufficient accuracy, i.e. so as not to allow short-duration fluctuations to have an effect. Such a measuring device can, for example, work on the basis that each control unit generates a request signal given the respective processing of all pending information processing requests, the request signal being, among other things, supplied to the measuring device. The measuring device now counts the number of such request signals that have appeared in the control unit, the counting occurring over the specific time intervals, for example over one second or over five seconds. In FIG. 2 a measuring device M is provided per control unit and connected thereto by way of the line m. The measuring device M receives the request signal over the measuring line m at each appearance of such signal. The measuring device counts the request signals in a known manner. It receives a start character and an end character, i.e. two timing marks that mark the measuring time interval, from a central timing signal generator r and over a step-down or dividing device U. The measuring device now identifies the number of request signals of the respective group control unit arriving between two such timing marks. It transfers this number to a comparison device W in which a constant value is stored, the comparison device comparing the declaration regarding the number of request signals to the constant value. It is assumed, here, that three different identification results are provided with respect to the loadability. This plurality is in no way binding, but can also be selected higher. After each measuring time interval of the measuring device M has elapsed, therefore, the comparison device W emits an identification result with respect to the loadability of the control unit that corresponds to the operating conditions prevailing at that time of day.

A loadability measurement is individually provided for each of the group control units GP1-GPn. However, it is likewise, or proceeding therebeyond, possible to provide such a loadability measurement for the central control unit. It can also be provided that a loadability measurement is provided only at the central control unit and that the identification results thereby acquired in the form of weighting declarations by a measuring device assigned to the central control unit are emitted to the counters Z assigned to the group control units.

The identification result relating to the loadability of the respective control unit conditioned by the time of day and respectively identified in continuing repetition in the described manner is three-fold and consequently always comprises three different weighting declarations. Each significance can assume different values, depending on the momentarily-given loadability of the control unit (where "loadability" here is to mean the number of work events, for example computational operations, control events, etc., that can be executed by the appertaining control unit to a measuring time interval). Three different weighting lines w1-w3 are provided for the transmission of the three weighting declarations, the weighting declarations being transmitted over the lines to three significance or weighting memory elements v1-v3. The three different weighting declarations per loadability measurement are also assigned individually to the three control lines x1-x3 of which one always respectively transmits an initial switch identifier from the group control unit to the counter Z and thus indicates of what respective type and, consequently, of what extent the work load for processing the incoming information assigned to the initial switch identifier is, the work load to be anticipated with the initial switch identifier just transmitted and to devolve upon the group control unit, as mentioned above. In this context, one can speak of three different initial switch identifiers for the designation of the respective type, the three control lines x1-x3 being assigned to the three different initial switch identifiers. Respectively, one of the three significance or weighting declarations is assigned to each of these three different, possible initial switch identifiers, the individual value of each of the declarations stating something regarding the loadability of the appertaining control unit with respective reference to the type indicated with each of the arriving initial switch identifiers and the corresponding extent of the work load devolving on the control unit.

The three weightings identified per measuring time interval now specify the number of counting steps per incrementation of the counter that are to be executed by the counter at the arrival of an initial switch identifier. The number of counting steps that the counter incrementally executes on the basis of an initial switch identifier is therefore dependent on both the respective initial switch identifier and on the respective identification result of the loadability and measurement.

The aforementioned deincrementation of the counter occurs at uniform time intervals. To this end, the central timing signal generator r supplies a deincrementation pulse to each of the counters at uniform time intervals, whereby the counter is counted down by one step.

Let it now be assumed that subscriber calls are to be refused when the counter reaches its fifth counting step, when, therefore, its fifth counting element z5 is marked. This therefore means that, given this operating condition, subscribers who pickup the receiver at their subscriber stations and therefore emit the line signal should not be given the possibility of effectively emitting selection identifiers. Given such an operating condition, therefore, the group control unit is inhibited from accepting and storing selection identifiers of subscriber stations of calling subscribers situated in call status.

It can be provided in conjunction herewith that busy signals are emitted in this operating condition to those subscriber stations which are in a call status. The marking of the counting element z5 therefore corresponds to a limiting value with respect to the incrementation and deincrementation of the counter; when it is exceeded due to incrementation of the counter, an overload criterion exists in the counter until reattainment of the limiting value as a result of the individual steps of the deincrementation operation. Accomplished in that, therefore, the incrementation on the basis of an initial switch identifier takes, on the one hand, the information processing traffic load to be anticipated for the appertaining group control unit and likewise for the central control unit and, on the other hand, the present loadability of the central control unit into consideration. This is done, in particular, by means of the number of counting steps executed in the respective incrementation, as well as that the deincrementation of the counter occurs at a constant rate is that an acceptance of selection identifiers on the part of the group control unit is pressed for a certain time interval that corresponds to the processing time of the most-recently accepted selection information. This time interval is therefore defined by the respective weighting declaration that is stored for the appertaining initial switch identifier in the appertaining weighting memory element v1, v2 or v3.

The accumulation of the initial switch identifiers therefore occurs in the counter Z. When the counter reaches the limiting value that the counting element z5 represents, then an overload criterion exists in the marking of the counting element or of a counter-valent counting element. The overload criterion, as a signal, is transmitted to the group control unit over the overload line 5. It is therefore formed between an initial switch identifier leading to the attainment of the limiting value and a first character of a corresponding information assigned thereto, i.e. incoming selection identifiers, and leads to the result that these characters are not accepted by the group control unit; the engagement of the busy signal for the subscriber can be undertaken at the same time so that he is informed by way of an audible signal that outputting selection identifiers will remain unsuccessful. The transmission of the overload signal over the line 5 therefore suppresses the acceptance of selection identifiers from calling subscribers. It is provided in another version that the transmission of the overload signal from the counter to the group control unit is lent the effect that further initial switch identifiers and incoming information corresponding thereto, for example selection identifiers, are not accepted, but that such information whose preceding initial switch identifier lead to the formation of the overload signal is still accepted. In this case, therefore, the information assigned to an initial switch identifier is also accepted whenever the initial switch identifier was still accepted; it is merely that further initial switch identifiers and the information assigned thereto are no longer accepted.

As may be derived from FIG. 2, a further overload line 7 is provided. An overload signal is only transmitted over this overload line when the counter reaches a correspondingly higher counter reading. An analogous case applies to an overload line 10. Let it be assumed that an overload signal transmitted over the overload line 5 serves the initiation of the group control unit to refuse selection identifiers from calling subscribers and that an overload signal transmitted over the overload line 7 serves the non-acceptance of selection identifiers arriving over incoming busy trunks. Since the counter reading of the counter indicates the momentary load of the group control unit, the acceptance of selection identifiers from calling subscribers is inhibited given a load degree corresponding to the counting element z5, whereas the acceptance of selection identifiers from connected incoming trunks is only inhibited at a higher load state. Given an even higher load state, the acceptance of information that the group control unit is suppose to accept from the central control unit can also be prevented.

It can therefore be seen that the determination of the traffic load and the recognition of overload situations in the group control units occurs by way of a counter provided in or at the group control unit and detecting the instances of seizure of the group control unit. The identification of the traffic load and the recognition of overloads therefore occurs at a decentralized location. For the purpose of averting information overloads, the overload signal generated by the counter effects, by way of the overload lines 5 and 7, that the seizure of the group control unit for the acceptance of information for those through-connections over the sub-switching matrix network of the appertaining line trunk group that of an incoming nature are prevented. Through-connections from the switching matrix network K to a trunk or to a subscriber line, however, can still be executed although the overload signal is already pending on the overload lines 5 and 7. It is only when the overload signal is also transmitted to the group control unit over the overload line 10 that through-connections of an outgoing nature are also no longer executed in that, when such an operating condition is reached, the appertaining group control unit is inhibited from accepting corresponding information. The overload line 10 therefore serves for the transmission of an overload blocking signal by way of which not only is an acceptance of information from the central control unit prevented, rather, in addition, it can also be provided that an output information to the appertaining group control unit is prevented, particularly the execution of through-connection operations within a line trunk group.

It should also be emphasized again that the identification of the traffic load and the recognition of overload situations occurs in the group control units, i.e. in partially centralized switch structure. The known counters provided therein are not supplied with overload signals, but with initial switch identifiers which institute the incrementation of the counters in accordance with the respective significance determined by the measuring device and the comparison device. The overload signals, therefore, are not supplied to the counters, but are generated by the counters. Control signals relating to the traffic load that are supplied to the counters are therefore not overload signals, rather control signals such as represent the beginning of a respective information portion to be received in a partially centralized group control unit, to be intermediately stored therein and to be retransmitted to the central control unit. As already explained, these control signals are initial switch identifiers. These control signals, however, can also be acquired in some other manner, namely on the basis of the arrival of a first selection identifier in a series of selection identifiers.

The use of the invention is not restricted to PCM telephone exchange systems, but can also be realized in telecommunication switching systems in analog technology. Particularly provided in this context is the possibility that an overload signal is transmitted to that call-associated switch device over which an initial switch identifier that lead to the attainment of the limiting value has arrived. The overload signal then causes the information to be processed which comprise initial switch identifiers and information characters that arrive in the call-associated switch device cannot be forwarded from the switch device. However, it is likewise possible to store an overload signal at a central location in assignment to a call-associated switch device and to therefore cause information incoming to the appertaining call-associated switch device not be accepted.

The further possibility exists that a character, particularly an audio character, is transmitted over a call-associated switch device at which an overload signal was output or for which an overload signal has been stored, the character indicating that information characters are not be received over the call-associated switch device. This is principally a matter of the busy signal.

In contrast to known arrangements, therefore, the identification of the information traffic load accruing for the central control unit occurs at a decentralized location, and, in particular, not at a single decentralized location, but in all group control units. The counters are well known in the art and are disclosed, for example in the German application No. P 32 36 130. In contrast to the technique disclosed therein, however, the identification of the information traffic load and the formation of overload signals does not occur at the central location in some other manner and the overload signals are not transmitted from the central location to the decentralized locations, rather, initial switch identifiers are supplied to the counters and the overload signals are generated by the counters instead of being supplied thereto. A time saving on the basis of which a correspondingly-early aversion of overloads is possible is achieved in that initial switch identifiers are supplied to the counters, namely decentralized. The overload situation for a central control unit is practically predictable and defensive measures can be undertaken so early that the overload situation can be prevented from occurring at all at the very outset. Co-employed for this time-saving situation is, among other things, the chronological interval between initial switch identifiers that are supplied to the counters and the information (for example, incoming selection identifiers) individually assigned to the initial switch identifiers, the totality of the information being responsible for the information traffic load devolving on the central control unit. An existing overload signal likewise does not lead to a general input inhibition of information for the central control unit, but rather leads to the rejection of individual occupations, for example, occuptions produced by a subscriber call, that are randomly distributed over the entire traffic scene. It therefore become possible to design the overload defense to be very precise and to cancel the temporarily-undertaken defensive measures as soon as an occurring traffic overload has been worked off. As a result of this measure, the measures to avert overloads do not have a uniform effect on all instances of a seizure of the group control units, rather these instances differ in the described manner with respect to incoming through-connections and outgoing through-connections over a sub-switching matrix network corresponding to a group control unit and it is therefore achieved that, first, the measures to avoid overloads are very effective with respect to the limitation of the information processing traffic load and that, second, one avoids having work already performed on the part of a partially centralized switch device and on the part of the central control unit being subsequently discarded, namely due to the rejection of a request of a partially decentralized group control for the execution of an outgoing connection, i.e. for a call setup for which information processing has already been performed on the part of the group control unit and on the part of the central control unit.

The use of the known counter of the aforementioned German application No. P 32 36 130 in a new technical context is very significant in the described contexts. What is achieved is that these counters are supplied with information that influence the respective extent of an incrementation event of the counters based on the measure of a weighting that derives both from the nature of the information processing job respectively devolving on the group control unit and on the central control unit, as well as from results of the information processing loadability of the central control unit conditioned by the time of day is that the traffic load devolving upon this central control unit is optimally matched in a high-grade manner to the call handling capability of the central control unit. The respective measure of the momentary traffic load per group control unit is always immediately available due to the utilization of the counter at a decentralized location. Unlike known systems, it is not necessary that the arriving occupations be counted over an identification time interval, whereby the traffic load that occurred during such an identification time interval would only be palpable respectively after such an identification time interval had elapsed, as a result of which a result of such a traffic load identification would only be available after a mean delay time that corresponds to half of the identification time interval. This known method of tallying in successive identification time intervals also makes it necessary that the respective identification time intervals must be selected sufficiently long in view of the number and distribution of the events to be counted which, given application of such a known counting method at a decentralized location instead of a centralized location would lead to the fact that the identification time intervals would even have to be dimensioned correspondingly longer. The disadvantages, however, are also avoided by way of the above-described exemplary embodiment of the invention.

It can therefore be provided that the overload signal comprising an attainment of a specific counter reading leads to the fact, when it arrises between an initial switch identifier and the incoming selection information appertaining thereto, that an acceptance of the latter is prevented or that the latter are still accepted but an acceptance of a further initial switch identifier together with its appertaining selection information is prevented. Both alternatives are realizable both for that instance in which the overload signal is processed in and by the group control unit itself as well as for that instance in which it is emitted to a call-associated switch device (for example, a connector set). The overload signal can consist therein that a specific counting element of the counter Z is marked and a corresponding overload signal is transmitted over one of the lines 5, 7 or 10. However, it is likewise possible that the overload criterion arises in that, in the reverse direction, a corresponding counting element marking is canceled and that an acceptance of further initial switch identifiers or, respectively, selection identifiers is prevented as a result thereof.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A telecommunications system comprising:

a plurality of lines and trunks, arranged in groups, for connection to subscriber stations and for carrying call information including initial switching identifiers as control signals followed by characters;

a central information-processing system having a limited call-handling capability with respect to its information-processing capacity;

a switching network connected to said central information processing system;

a plurality of partially-centralized switching devices each connected to a respective line/trunk group and to said central information-processing system via said switching network, and each operable to receive, intermediately store and transmit call information to said central information-processing system for processing to set up calls between calling and called subscriber stations;

traffic load measuring means connected to each of said partially-centralized switching devices and responsive to said initial switching identifiers to produce control signals representing said switching identifiers and therefore representing the information-processing traffic load;

a plurality of cyclically-decremented counting means each connected to a respective partially-centralized switching device, each of said counting means incremented only by said control signals representing switching indentifiers and operable to produce and transmit an overload signal to the respective partially-centralized switching device upon reaching a predetermined count representing a traffic load limiting value to prevent acceptance of following characters when such characters have not yet been received and prevent the acceptance of further initial switching identifiers when such characters have already been received; and means connected to and operable to cyclically deincrement said counting means at uniform time intervals.

2. The telecommunications system of claim 1, and further comprising:

a plurality of call-associated switching means for receiving the initial switching identifiers; and means for transmitting an overload signal as an inhibit signal to a call associated switching means over which an initial switching identifier was received which led to attaining a limiting value of said counter.

3. The telecommunications system of claim 1, and further comprising:

a plurality of call-associated switching means for receiving the initial switching identifiers; and means for storing an overload signal in assignment to a call-associated switching means over which an initial switching identifier was received which led to attaining a limiting value of said counter.

* * * * *